United States Patent
Peck

(10) Patent No.: US 9,193,292 B2
(45) Date of Patent: Nov. 24, 2015

(54) CAMPER ASSEMBLY

(76) Inventor: Victor Anthony Peck, Yowie Bay (AU)

(*) Notice: Subject to any disclaimer, the term of this patent is extended or adjusted under 35 U.S.C. 154(b) by 173 days.

(21) Appl. No.: 13/642,451

(22) PCT Filed: Apr. 21, 2011

(86) PCT No.: PCT/AU2011/000469
§ 371 (c)(1),
(2), (4) Date: Jan. 3, 2013

(87) PCT Pub. No.: WO2011/130802
PCT Pub. Date: Oct. 27, 2011

(65) Prior Publication Data
US 2013/0093208 A1    Apr. 18, 2013

(30) Foreign Application Priority Data
Apr. 21, 2010   (AU) ................................ 2010901688

(51) Int. Cl.
*B60P 3/34*   (2006.01)
*B60P 3/355*   (2006.01)
(52) U.S. Cl.
CPC ..................................... *B60P 3/341* (2013.01)
(58) Field of Classification Search
CPC ........................................................ B60P 3/341
USPC .......... 296/165, 26.09, 170, 173, 26.08, 174, 296/175, 169
See application file for complete search history.

(56) References Cited

U.S. PATENT DOCUMENTS

| 1,508,065 | A |   | 9/1924  | Ramsdell |
|-----------|---|---|---------|----------|
| 4,465,316 | A |   | 8/1984  | Roisen |
| 5,011,216 | A |   | 4/1991  | Baughman |
| 5,066,065 | A | * | 11/1991 | Baughman ..................... 296/165 |
| 6,179,368 | B1 |   | 1/2001  | Karlsson |
| 8,632,119 | B2 | * | 1/2014  | Mazac ........................... 296/173 |

FOREIGN PATENT DOCUMENTS

DE   2709378        9/1978
EP   1232907 A1    8/2002

OTHER PUBLICATIONS

ISR for related PCT/AU2011/000469 issued on Oct. 23, 2012.
IPRP for related PCT/AU2011/000469 mailed on Jul. 8, 2011.

* cited by examiner

*Primary Examiner* — Glenn Dayoan
*Assistant Examiner* — Melissa A Black
(74) *Attorney, Agent, or Firm* — Ladas & Parry, LLP

(57) ABSTRACT

A camper assembly (20) comprising: a first section (22); a second section (24) connected to the first section (22), the first and second sections (22, 24) being generally horizontally movable relative to each other between a compacted configuration of the camper assembly (20) at which the second section (24) is adjacent the first section (22) and an expanded configuration of the camper assembly (20) at which the second section (24) is spaced from the first section (20); and a wall assembly (88, 120, 130) extending between the first and second sections (22, 24) in the expanded configuration of the camper assembly (20); wherein the first section (22) includes an attachment assembly (86) which solely supports the camper assembly (20) on a tow hitch receiver (210) of a tow vehicle (200) in the compacted configuration of the camper assembly (20).

18 Claims, 11 Drawing Sheets

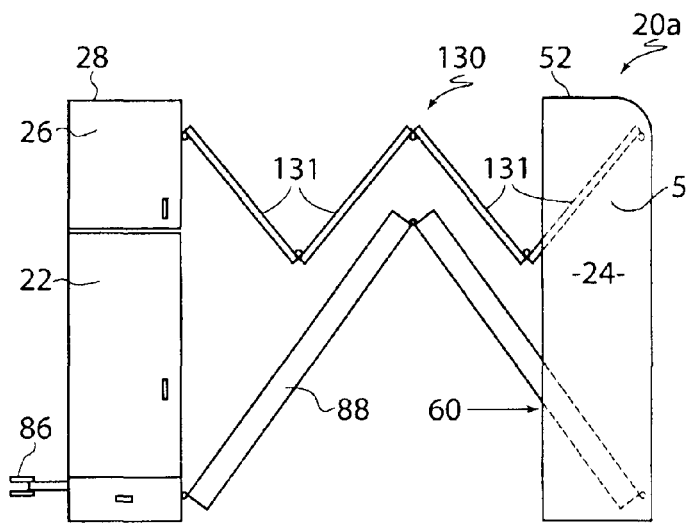
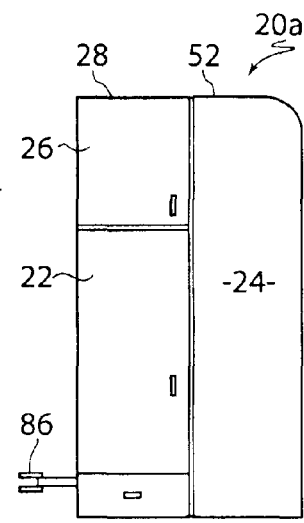
FIG. 16  FIG. 15
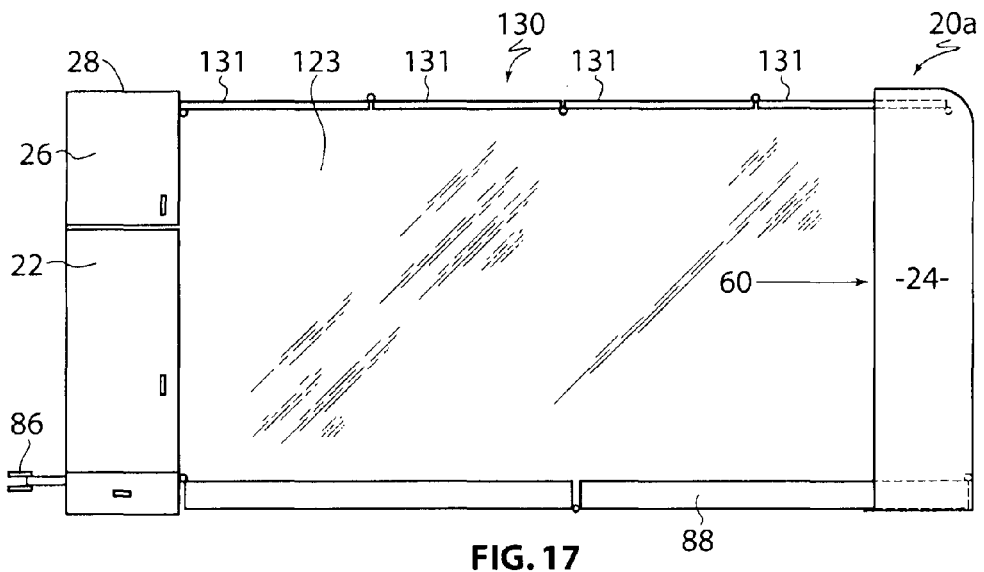
FIG. 17

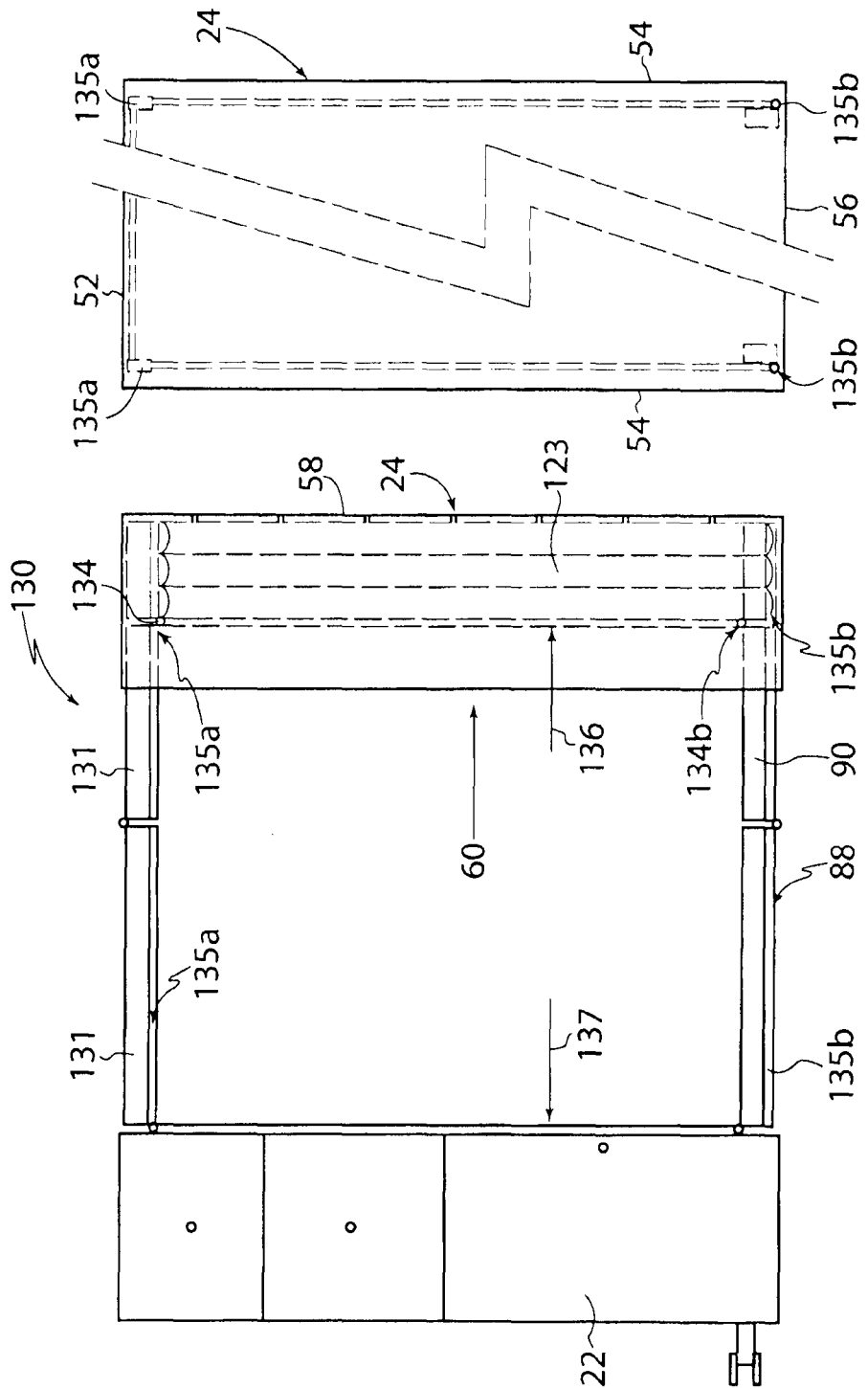

CAMPER ASSEMBLY

CROSS-REFERENCE TO RELATED APPLICATIONS

This application is the U.S. National Stage of International Patent Application No. PCT/AU2011/000469 filed on Apr. 21, 2011, which claims priority to Australian Patent Application No. 2010901688 filed on Apr. 21, 2010, the disclosures of which are hereby incorporated by reference in their entireties.

FIELD OF THE INVENTION

The present invention relates to a camper assembly for attachment to a tow hitch receiver of a tow vehicle.

BACKGROUND OF THE INVENTION

Caravans and camper trailers (campers) typically include a chassis supporting a camper body on one or more axles with sets of ground support wheels. The chassis has a link for attachment to the tow hitch of a tow vehicle, which is usually a large car such as a four wheel drive vehicle.

Tow hitches are provided in two configurations, being a receiver type and fixed-drawbar type. A receiver-type tow hitch includes a frame that mounts to the vehicle chassis. The frame includes a rearward extending hollow square tube, which has an opening that receives a removable tow ball mount. The tow ball mount includes a square tube for insertion to the hitch receiver tube, and a flange having a hole for attachment of a tow ball. Fixed-drawbar hitches have the tow hitch mount built integrally with the frame that attaches to the vehicle chassis, and includes the flange having a hole for the tow ball.

A disadvantage of prior art campers is that they are heavy and require towing, which adds significantly to the fuel consumption of the tow vehicle. Another disadvantage is that they are usually large and require substantial space to store and park. Most prior art campers are also unable to be towed over rough (off-road) terrain.

OBJECT OF THE INVENTION

It is an object of the present invention to overcome or ameliorate some of the disadvantages of the prior art, or at least to provide a useful alternative.

SUMMARY OF THE INVENTION

The present invention provides camper assembly to be attached to and supported by a tow hitch receiver of a vehicle, the camping assembly comprising:
a first section;
a second section connected to the first section to provide for relative generally horizontal movement therebetween, between a compacted configuration of the camper assembly, at which the second section is adjacent the first section, and an expanded configuration of the camper assembly, at which the second section is spaced from the first section;
a wall assembly extending between the first and second sections in the expanded configuration of the camper assembly; and
an attachment assembly secured to the first section and configured to solely support the camper assembly on the tow hitch receiver when the camper assembly is in the compacted configuration.

The wall assembly preferably comprises a flexible material extending across open spaces between peripheral walls of the first and second sections. Preferably, the wall assembly is stored within the first section and/or the second section in the compacted configuration of the camper assembly.

The first section is preferably connected to the second section via a foldable mattress frame, the mattress frame being movable between a folded configuration wherein the mattress frame is stored within the first section and/or the second section in the compacted configuration of the camper assembly, and an extended configuration wherein the mattress frame extends substantially horizontally between the first and second sections in the expanded configuration of the camper assembly.

The mattress frame preferably includes a first half and a second half which are substantially co-extensive with each other and pivotally connected to each other at their first ends, a second end of the first half being pivotally connected to the first section and a second end of the second half being pivotally connected to the second section. Each of the first and second halves preferably includes first and second spaced side beams with slats extending therebetween. Each side beam is preferably C-shaped in cross-section to define a channel, with the channels in each pair of side beams facing each other, and wherein the slats extend between lower webs of the side beams.

The camper assembly preferably further includes a mattress received in the mattress frame, wherein the mattress is folded with the mattress frame in the folded configuration of the mattress frame, and the mattress is supported by the mattress frame in the extended configuration of the mattress frame.

The camper assembly preferably further includes at least one foldable link connecting the first section to the second section, each link being movable between a folded configuration wherein the link is stored within the first section and/or second section in the compacted configuration of the camper assembly, and an extended configuration wherein the link extends between top walls of the first and second sections in the expanded configuration of the camper assembly.

Each link preferably includes a first rod and a second rod which are substantially co-extensive with each other and pivotally connected to each other at their first ends, a second end of the first rod being pivotally connected to the first section and a second end of the second rod being pivotally connected to the second section, wherein each link includes a means for locking the first and second rods in the extended configuration.

The camper assembly preferably further includes a foldable roof assembly, the roof assembly being movable between a folded configuration wherein the roof assembly is stored within the first section and/or second section in the compacted configuration of the camper assembly, and an extended configuration wherein the roof assembly extends between top walls of the first and second sections in the expanded configuration of the camper assembly.

The roof assembly preferably comprises a plurality of contiguous panels hingedly connected to each other in series, and wherein the roof assembly include a locking means for locking the panels in the extended configuration.

The first section is preferably generally rectangular prism shaped and includes side walls, a top wall, a bottom wall, a rear wall and a front wall, wherein the first section is substantially hollow and includes storage compartments therein. The second section is preferably shaped substantially similar to the first section and includes a top wall, side walls, a bottom wall and a rear wall, which together define an internal space therewithin. In the compacted configuration of the camper assembly, front edges of the top wall; side walls and bottom wall of the second section preferably abut corresponding rear edges of the top wall, side walls and bottom wall of the first section. The camper assembly preferably further includes locking means for retaining the first and second sections to each other in the compacted configuration.

The camper assembly preferably further includes a roller support assembly extending from the second section, the roller assembly being movable towards the second section to be raised from the ground, or away from the second section to engage the ground for supporting the second section.

The camper assembly preferably further includes a support post assembly extending from the first section, the support post being movable towards the first section to be raised from the ground, or away from the first section to engage the ground for supporting the first section.

The attachment assembly preferably includes a square insertion tube for insertion to the tow hitch receiver, and a mount portion to which the camper assembly is mounted. Lock apertures are preferably formed in the sides of the insertion tube for receiving a lock pin therethrough when aligned with corresponding apertures of the tow hitch receiver.

The camper assembly preferably further includes upper and lower tracks formed in the extended configuration of the camper assembly, the tracks being for guiding side walls of the wall assembly which are movable between a retracted configuration and an extended configuration at which the side walls extend between the first and second sections.

The side walls are preferably stored within the second section in their retracted configuration. The side walls are preferably biased toward their retracted configuration and include attachment means for attaching edges of the side walls to the first section.

BRIEF DESCRIPTION OF THE DRAWINGS

Preferred forms of the present invention will now be described by way of examples only, with reference to the accompanying drawings, wherein:

FIG. 6A shows the second link in its locked extended configuration;

FIG. 15 is a side view of a second embodiment of the camper assembly in its compacted configuration;

FIG. 16 is a schematic side view of the camper assembly of FIG. 15 during assembly thereof to its expanded configuration;

FIG. 17 is a schematic side view of the camper assembly of FIG. 15 in its expanded configuration;

FIG. 18 shows a third embodiment of the camper assembly in its expanded configuration; and FIG. 19 shows a schematic rear view of the camper assembly of FIG. 18.

DETAILED DESCRIPTION OF THE PREFERRED EMBODIMENTS

Figure 1:
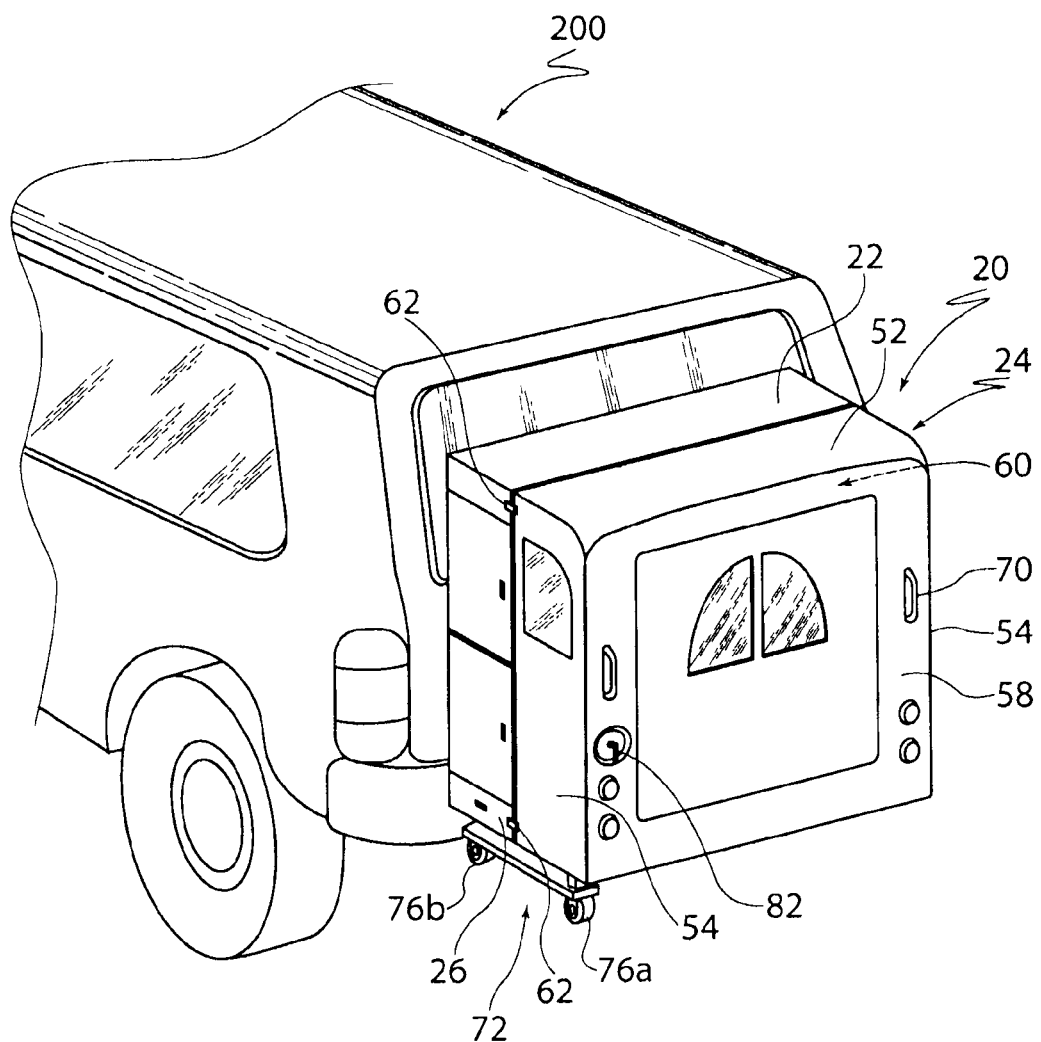
FIG. 1 is a perspective view of a camper assembly according to a preferred embodiment of the present invention attached to a tow vehicle, the camper assembly being in its compacted configuration.
Figure 3:
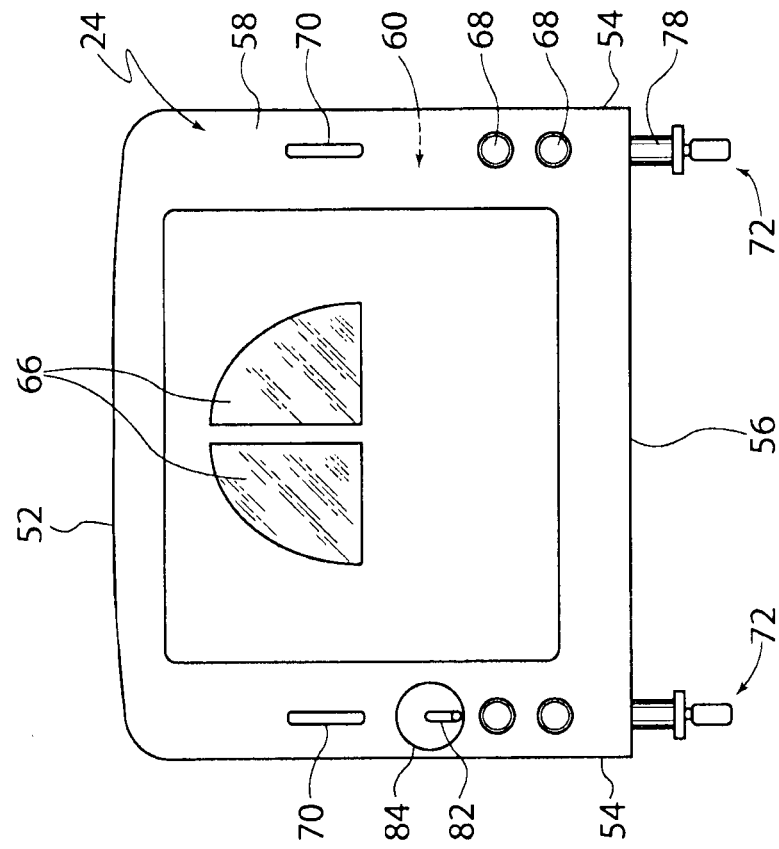
FIG. 3 is a rear view of the camper assembly of FIG. 1.
Figure 2:
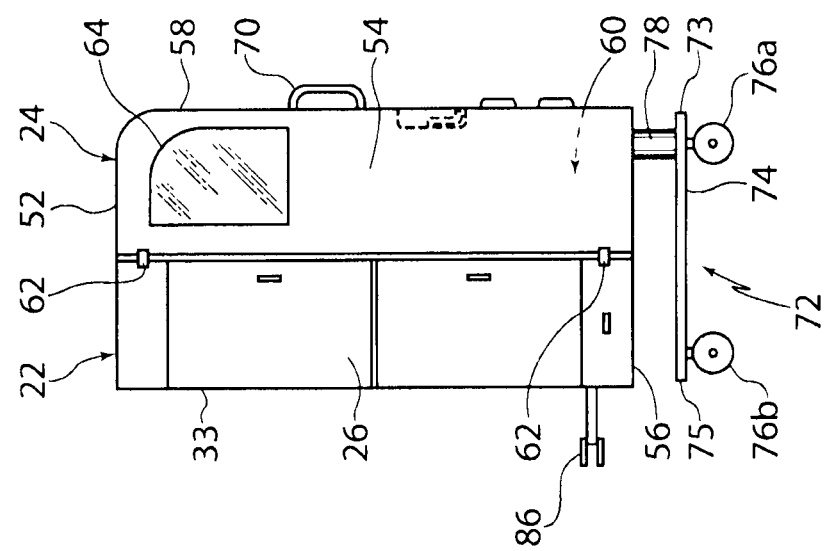
FIG. 2 is a side view of the camper assembly of FIG. 1 in its compacted configuration.
Figure 8:
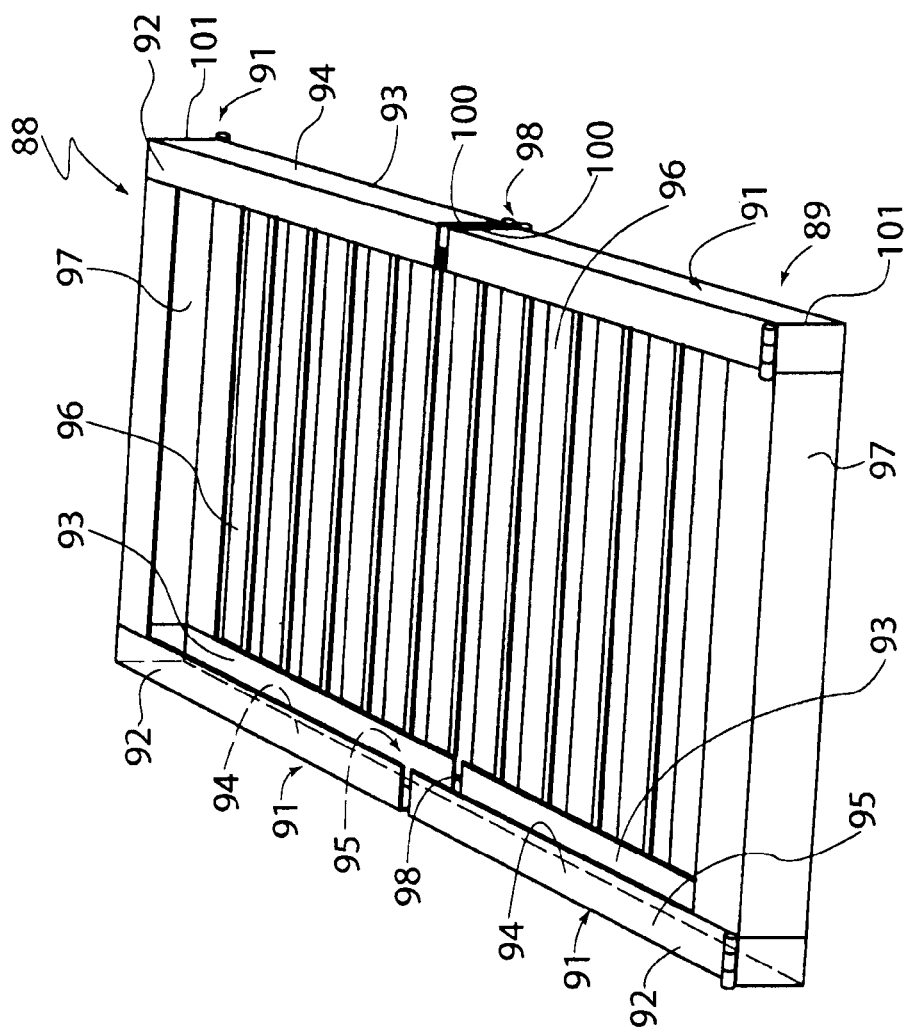
FIG. 8 is a perspective view of the mattress frame of FIG. 7 in its extended configuration.
Figure 9:
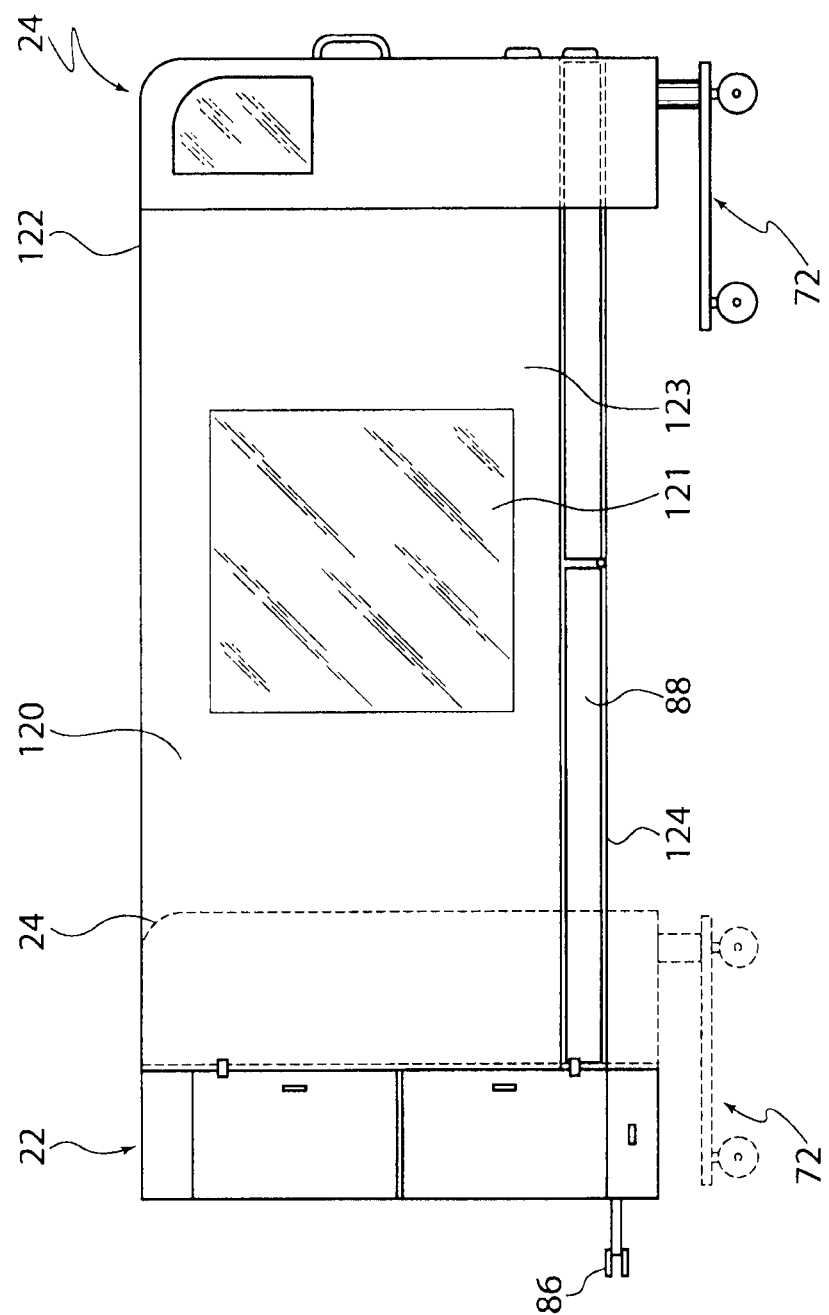
FIG. 9 is a schematic side view of the camper assembly of FIG. 1 in its expanded configuration.
Figure 10:
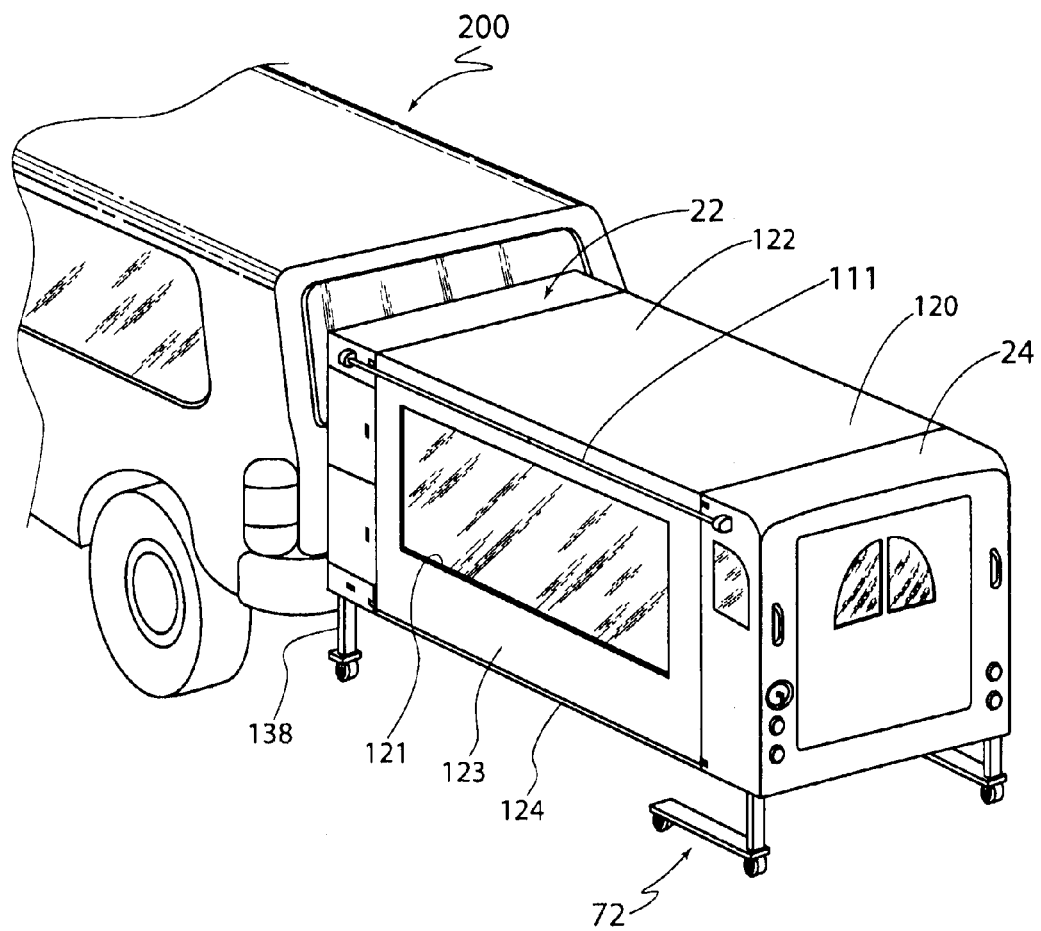
FIG. 10 is perspective view of the camper assembly of FIG. 1 in its expanded configuration.

FIGS. 1 to 10 show a camper assembly 20 according to a first preferred embodiment of the present invention. The camper assembly 20 includes a first section 22 and a second section 24 which are moveable relative to each other between a compacted configuration as shown in FIGS. 1 to 3 and an expanded configuration as shown in FIGS. 9 and 10.

Figure 4:
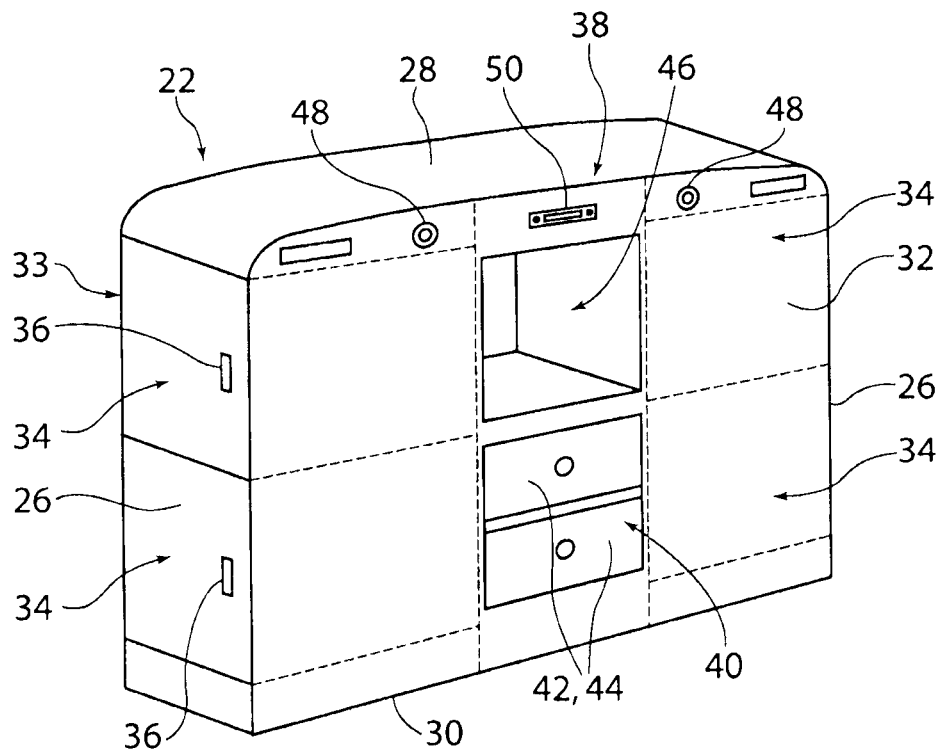
FIG. 4 is a perspective view of a first section of the camper assembly of FIG. 1.

The first and second sections 22 and 24 are generally rectangular prism shaped. As shown in FIG. 4, the first section 22 includes side walls 26, top wall 28, bottom wall 30, a rear wall 32 and a front wall 33. The first section 22 is substantially hollow and includes storage compartments 34 which are accessible via doors 36 formed in both side walls 26. The storage compartments 34 extend to a substantially central portion 38 of the first section 22. Additional storage compartments 40 are provided at the central portion 38 which are accessible via the rear face 34. Lower storage compartments 42 are accessible via drawers 44 and an open storage compartment 46 is open to the rear face 34 for insertion of an appliance as desired, such as a television or microwave oven. Lights 48 can also be built in to the rear wall 34 as well as other additional desired items such as a music player 50.

The second section 24 is shaped substantially similar to the first section 22, and includes a top wall 52, side walls 54, bottom wall 56 and a rear wall 58. The second section 24 does not include a front wall. The top wall 52, side walls 54, bottom wall 56 and rear wall 58 together define an internal space 60 therewithin which houses the mattress assembly 87 as described below. In the compacted configuration of the camper assembly 20, front edges of the top wall 52, side walls 54 and bottom wall 56 of the second section 24 abut corresponding rear edges of the top wall 28, side walls 26 and bottom wall 30 of the first section 22. In this compacted configuration, the respective top walls 28 and 52, side walls 26 and 54, and bottom walls 30 and 56 are substantially co-planar with each other. Latches 62 in the side walls 26 and 54 are used to retain the first and second sections 22, 24 to each other in the compacted configuration as desired.

The second section 24 includes a window 64 in its side wall 54, and its rear wall 58 includes window 66, lights 68 and handles 70.

Figure 11:
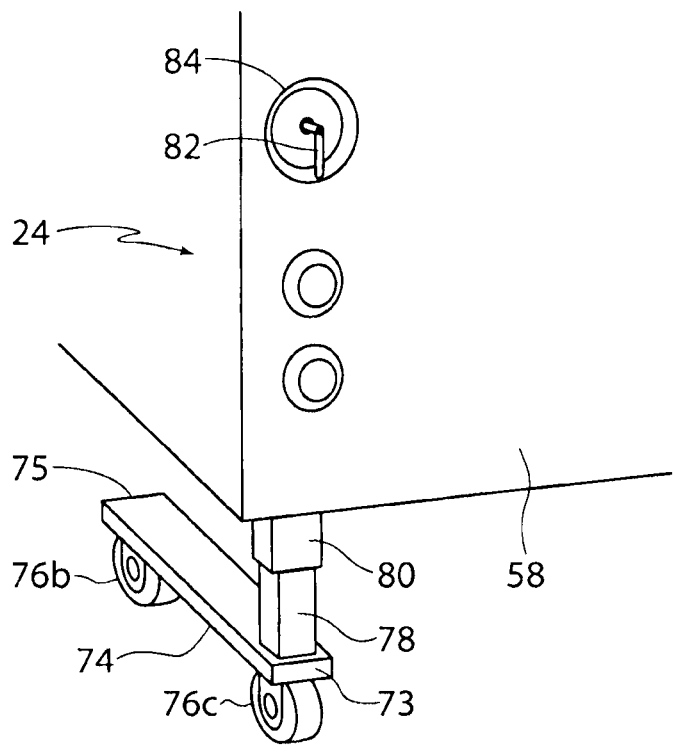
FIG. 11 is a partial perspective view showing the height adjustment mechanism for the roller support assembly for the camper assembly of FIG. 1.
Figure 12:
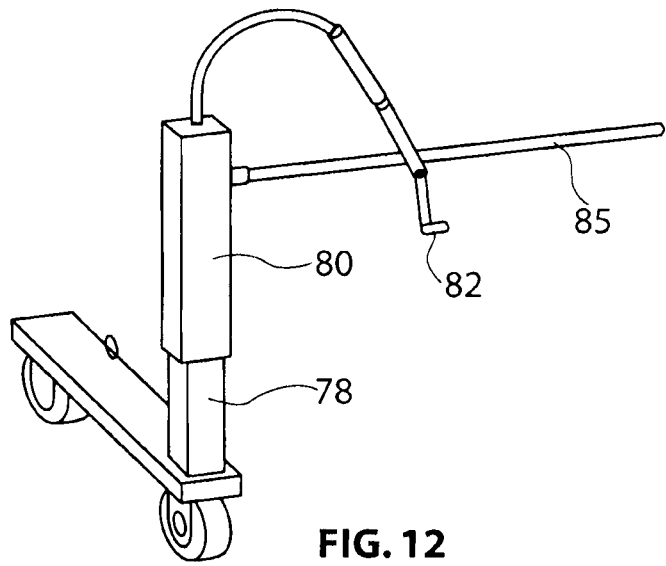
FIG. 12 is an isolated schematic perspective view of the height adjustment mechanism of FIG. 11.

Referring to FIGS. 2 and 3, a roller support assembly 72 extends from the bottom wall 56 of the second section 24 adjacent each side wall 54. Each roller support assembly 72 includes a horizontal bar 74 having a rear end 73 and a front end 75. The rear end 73 is substantially in line with the rear wall 58 of the second section 24, and the front end 75 is substantially in line with the front wall 34 of the first section 22 in the compacted configuration of the camper assembly 20. A first ground support wheel 76a is attached adjacent the rear end 73 and a second ground support wheel 76b is attached adjacent the front end 75 of the bar 74. As shown in FIGS. 11 and 12, the bar 74 includes a vertical post 78 which extends upwardly from adjacent its rear end 73, which is received in a hollow tube 80 mounted within the second section 24. The post 78 is retractable in a telescoping manner within the tube 80 via a suitable mechanism such as a rack and pinion assembly therebetween. The telescoping movement between the post 78 and the tube 80 is controlled via a rotatable handle 82, which is held in a recess 84 in the rear wall 58. A link 85 connects the telescoping movement of the support assemblies 72 together, such that the support assemblies 72 are movable simultaneously towards the bottom wall 56 or away therefrom to engage the ground.

Figure 13:
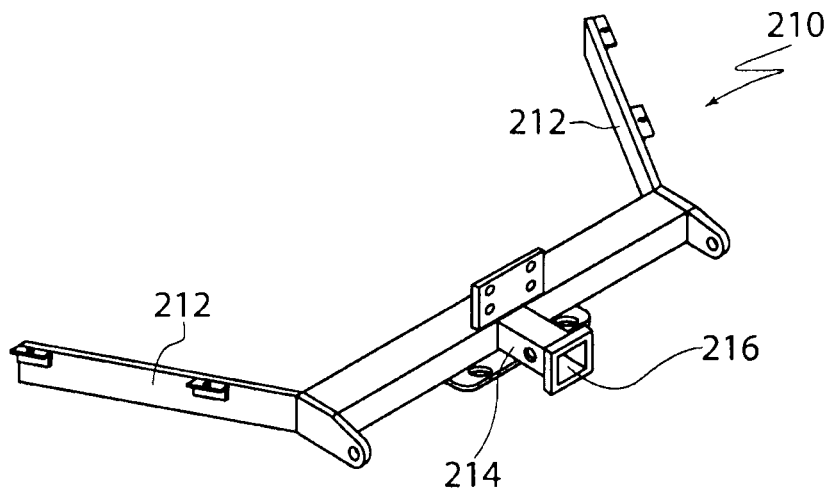
FIG. 13 is a perspective view of a tow hitch receiver for a vehicle.
Figure 14:
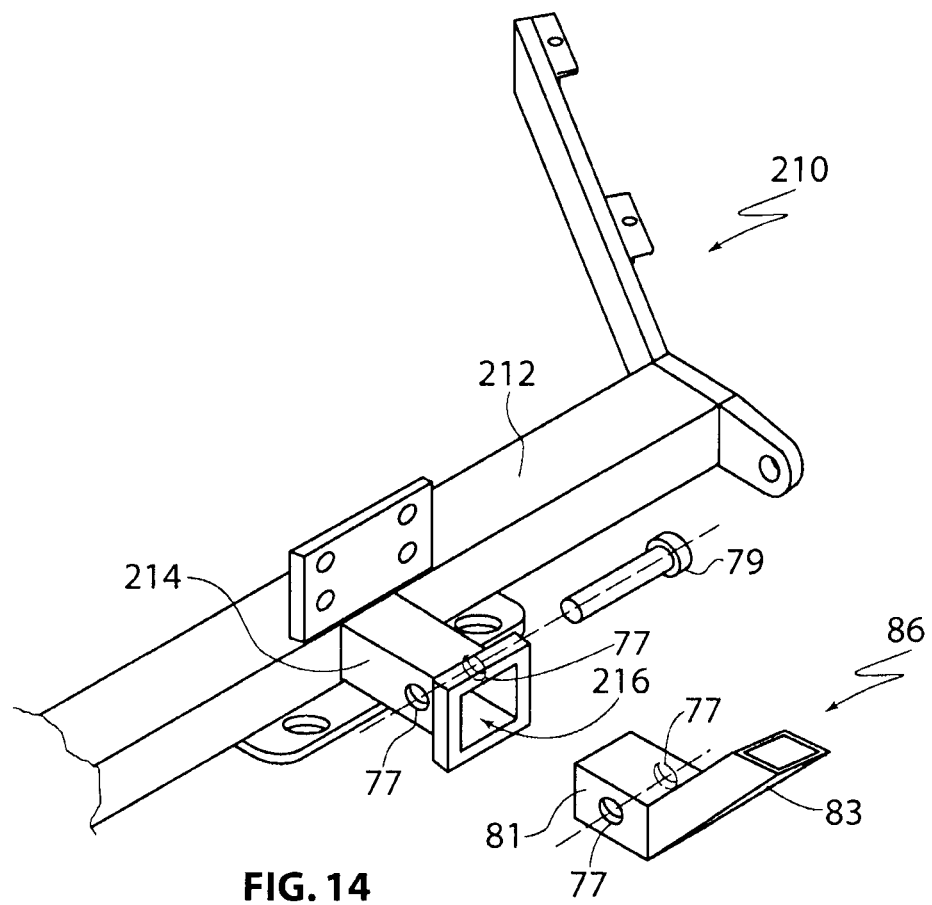
FIG. 14 is a perspective view of a tow hitch attachment for the camper assembly of FIG. 1 in position for insertion to the vehicle hitch receiver.

Referring to FIGS. 2, 13 and 14, a tow hitch attachment 86 extends from the front wall 33 of the first section 22. The camper assembly 20 in use is attached to a hitch receiver assembly 210 of a tow vehicle 200 via the tow hitch attachment 86. The hitch receiver assembly 210 includes a frame 212 that mounts to the vehicle chassis. The frame 212 includes a rearward extending hollow square tube 214, which has an opening 216 that usually receives a removable tow ball mount or other hitch carrier. The tow hitch attachment 86 includes a square insertion tube 81 for insertion to the hitch receiver tube 214, and a mount portion 83 to which the camper assembly 20 is mounted. Lock apertures 77 are formed in the sides of the hitch receiver tube 214 and the insertion tube 81 for receiving a lock pin 79 therethrough when aligned for locking the camper assembly 20 to the hitch receiver 210.

When towing the camper assembly 20 from one place to another, the camper assembly 20 is in its compacted configuration with the roller assemblies 72 being in their raised position adjacent the bottom wall 56 and spaced from the ground. The tow hitch attachment 86 solely connects and supports the camper assembly 20 to the tow vehicle 200 and maintains the upright orientation of the camper assembly 20 relative to the tow vehicle 200. The longitudinal and square cross-section engagement between the hitch receiver tube 214 and the insertion tube 81 resists tilting of the camper assembly 20 relative to the tow vehicle 200. In an alternative embodiment however, the camper assembly 20 can include additional support means for attachment to a roof or rear portion of the tow vehicle 200.

Figure 5:
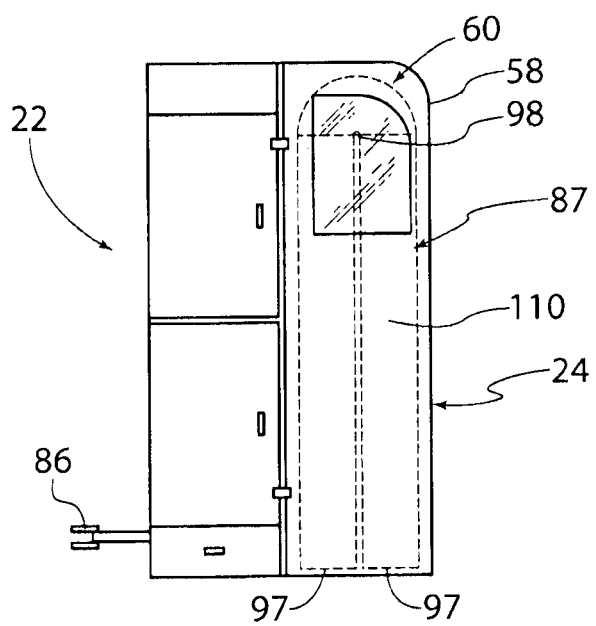
FIG. 5 is a schematic side view of the camper assembly of FIG. 1 in its compacted configuration showing an outline of the folded mattress stored therein.
Figure 6:
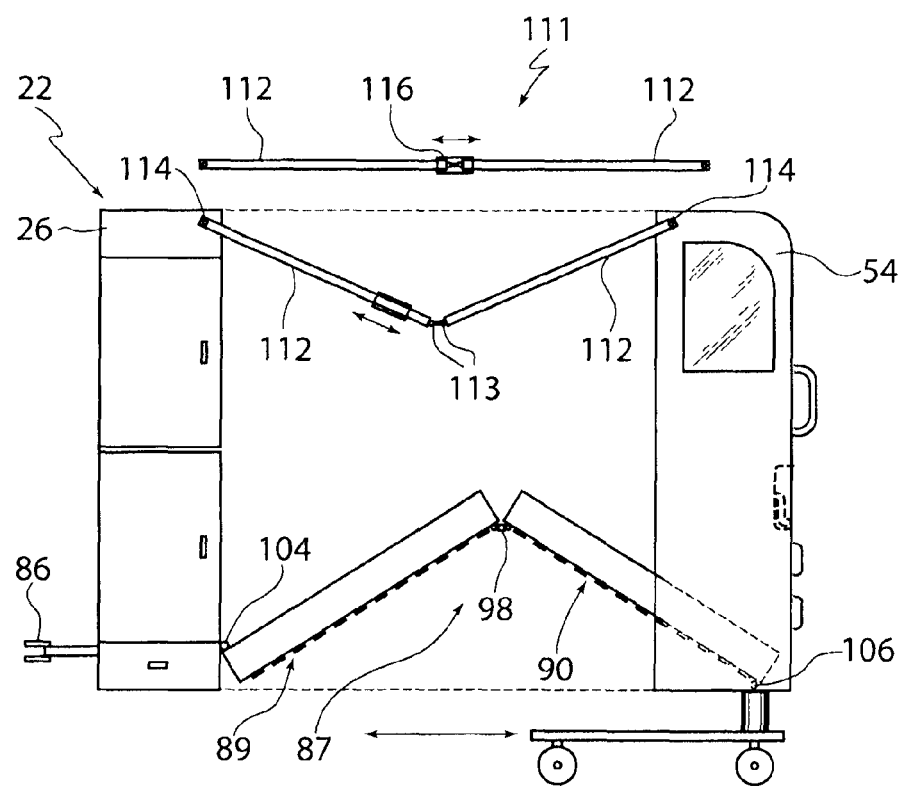
FIG. 6 is a schematic side view of the camper assembly of FIG. 1 during assembly thereof to its expanded configuration, where
Figure 7:
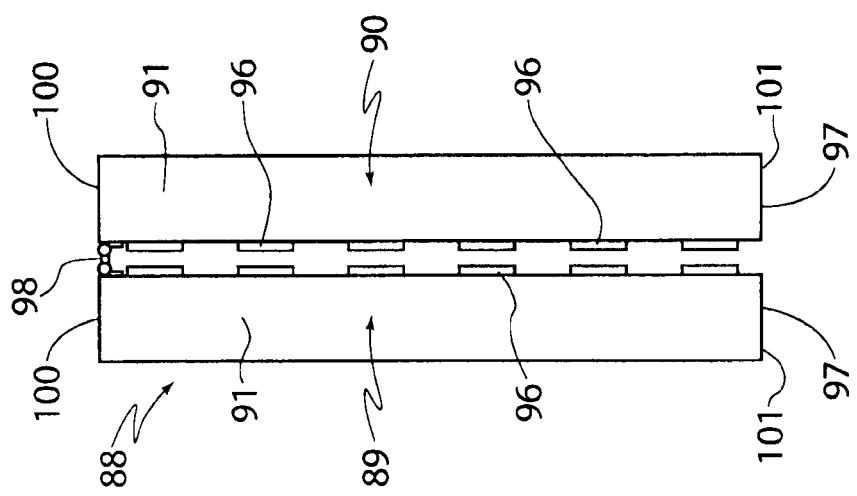
FIG. 7 is a side view of the mattress frame for the camper assembly of FIG. 1 in its folded configuration.

FIGS. 5 to 8 show the mattress assembly 87 for the camper assembly 20, which includes a foldable mattress frame 88 and a mattress 110. As shown in FIGS. 6 and 7, the mattress frame 88 includes a first half 89 and a second half 90 which are substantially co-extensive which each other. Each of the first and second halves 89, 90 includes first and second spaced side beams 91. Each side beam 91 is C-shaped in cross-section and includes an upper web 92, a lower web 93 parallel and spaced from the upper web 92, and a side web 94 extending between corresponding outer longitudinal edges of the upper and lower webs 92, 93. The webs 92 to 94 define the C-shaped cross-section of the side beams 91, and also define a channel 95 therebetween. The channels 95 in each pair of side beams 91 face each other. Spaced slats 96 extend between the lower webs 93 of each pair of side beams 91. The slats 96 are spaced from first ends 100 to second ends 101 of the side beams 91.

The first ends 100 of the first and second halves 89, 90 are connected to each other via hinges 98 mounted to the lower webs 93. This allows the first and second halves 89, 90 to move between a folded configuration as shown in FIG. 7 and an extended configuration as shown in FIG. 8. In the folded configuration, the first and second halves 89, 90 are substantially parallel to each other with the slats 96 of each half 89, 90 being adjacent each other. In the extended configuration, the first and second halves 89, 90 are substantially parallel and aligned with each other, and form the support for the mattress 110. An end web 97 extends between second ends 101 of the side beams 91.

As shown in FIG. 5, the mattress 110 is received between the facing channels 95 of the side beams 91. In the folded configuration of the mattress frame 88, the mattress 110 is also folded and extends from one end wall 97, over the hinge 98, and to the other end wall 97. The folded mattress assembly 87 is stored within the internal space 60 of the second section 23 in the compacted configuration of the camper assembly 20.

As shown in FIG. 6, the first half 89 is connected to a lower portion of the first section 22 via hinges 104 at the junction between its upper web 92 and its end wall 97. The second half 90 is connected to a lower portion of the second section 24 via hinge 106 located at the junction between its lower web 93 and its end wall 97. The mattress frame 88 provides a first link between the first and second sections 22 and 24 of the camper assembly 20.

A second link 111 extends between top portions of each pair of side walls 26 and 54. The second link 111 includes two rods 112 which are hingedly connected to each other at their first ends 113. Second ends 114 of the rods 112 are respectively pivotally attached to the side walls 26 and 54. A hollow sleeve 116 is slidable along the second link 111 and lockable in position at the hinge connection of the first ends 113 to maintain the second link 111 in the extended straight position as desired as shown in FIG. 6A. The sleeve 116 is moved away from the first ends 113 to allow the link to move to its folded configuration.

To assemble the camper assembly 20 from its compacted configuration to its expanded configuration, the roller support assemblies 72 are firstly lowered to the ground via the handle 82, to support the second section 24. The latches 62 between the first and second sections 22, 24 are then disengaged. The second section 24 is then moved away from the first section 22 as shown in FIG. 6, with the first section 22 remaining attached to the tow vehicle 200.

In the movement of the second section 24 away from the first section 22, the mattress frame 88 and the second link 111 move from their folded vertical configuration to their substantially horizontal straight configuration. In the extended configuration, the slats 96 of the mattress frame 88 provide the support for the mattress 110 to be in its flat configuration. The mattress frame 88 in its extended configuration also acts as a support chassis and provides strength and rigidity to the camper assembly 20.

A flexible wall material 120, such as tarpaulin or other suitable camping material, extends between the front edges of the second section 24 and the rear edges of the first section 22. This flexible wall material 120 is stored within the internal space 60 of the second section 23 in the compacted configuration of the camper assembly 20. The wall material 120 extends when the second section 24 is moved to the extended configuration, such that the wall material 120 is substantially taut as shown in FIGS. 9 and 10. In the extended configuration, the wall material 120 is supported by the second link 111 and forms a top wall 122, side walls 123 and a bottom wall 124. A window 121 is formed in the side walls 123. The wall material 120 can also include a zipper door (not shown) as entry into the space within the camper assembly 20 in its extended configuration.

The roller support assemblies 72 assist in attaching and withdrawing the camper assembly 20 to and from hitch receiver assembly 210 when required. The roller support assemblies 72 take the weight of the camper assembly 20 via the height adjustment mechanism. The roller support assemblies 72 thus allow the tow vehicle 200 to be disengaged and leave the camper assembly 20 as a free standing unit and allow the camper assembly 20 to be moved for storage. In attaching the camper assembly 20 to the tow hitch receiver assembly 210, the roller support assemblies 72 support the weight of the camper assembly 20 and move same to the required height. The height adjustment mechanism of the roller support assemblies 72 also allows same to level the camper assembly 20 in the expanded configuration when the ground is uneven.

The present invention thus provides a camper assembly which is lighter than other campers, and can provide accommodation therewithin and storage for a user as required. The camper assembly provides a full mattress for users, which is preferably the size of a double bed mattress. The weight of the camper assembly is typically between 70 and 150 kg.

Although the preferred embodiments of the present invention have been described, it will be apparent to skilled persons that modifications can be made to the above embodiments or that modifications to the above embodiments can be made. For example, the camper assembly can include additional means for supporting same to the tow vehicle as desired. As shown in FIG. 10, the first section 22 can also include extendable and retractable support posts 138. The support posts 138 can be extended to engage the ground and support the first section 22 in the extended configuration of the camper assembly. This allows the tow vehicle 200 to be detached from the camper assembly 20 and the extended camper assembly 20 to be fully supported by the support posts 138 and the roller support assemblies 72. The support posts 72 can for example be telescopic and extendable/retractable in a similar manner as the roller support assemblies 72.

Also, the mattress assembly, the second link and the flexible wall material can be contained in a space within the first section or in spaces within both the first and second sections. The bottom wall 124 can also be omitted from the wall material 120 such that the mattress frame 88 forms the bottom portion of the camper assembly internal space. In this alternative embodiment, the wall material 120 only extends across open spaces between peripheral walls (ie. top and side walls) of the first and second sections.

In an alternative embodiment, the first and second sections 22 and 24 can be connected by second links 111 extending between top and bottom portions of each pair of side walls 26 and 54. The mattress frame in this embodiment can be contained within the first and/or second sections 22 and 24, and can be configured as a foldable mattress frame similar to foldable sofa-bed mattress frames. After the sections 22 and 24 are moved apart, the mattress frame can then be extended between the sections 22 and 24.

FIGS. 15 to 17 show a camper assembly 20a according to a second embodiment of the present invention. The camper assembly 20a is very similar to the camper assembly 20 described above and for example includes the first section 22, second section 24, tow hitch attachment 86 and the mattress frame 88. In the camper assembly 20a however, the second link 111 has been replaced by a roof assembly 130.

The roof assembly 130 also replaces the top wall 122 (see FIG. 10) of the flexible wall material 120 to provide a hard roof to the camper assembly 20a. The roof assembly 130 includes four contiguous panels 131 which are hingedly connected to each other in series, with each panel 131 extending between the length between the side walls 26 and 54 of the first and second sections 22 and 24.

In the compacted configuration of the camper assembly 20a, the roof assembly 130 folds via the hinges between the panels 131 as shown in FIG. 16, such that the panels 131 are substantially parallel and adjacent each other. The folded roof assembly 130 fits within the internal space 60 of the second section 24 with the folded mattress frame 88. In the expanded configuration of the camper assembly 20a, the roof assembly unfolds to extend between the top walls 28, 52 of the first and second sections 22 and 24 and be substantially parallel therewith. Locking means (not shown), such as latches, are used to maintain the roof assembly 130 in the extended configuration. A flexible wall material is used to provide the side wall 123 of the camper assembly 20a as in the embodiment above.

FIGS. 18 and 19 show a camper assembly 20b according to a third embodiment of the present invention. The camper assembly 20b is similar to the camper assembly 20a. The roof assembly 130 in this embodiment comprises only two panels 131. Also, the panel 131 adjacent the second section 24 pivots at a hinge 134a which spaced from the rear wall 58 of the second section 24. The second half 90 of the mattress frame 88 pivots at a hinge 134b which is aligned vertically with the hinge 134a and spaced from the rear wall 58. The side walls 123 of flexible material are arranged in a curtain-like manner to run on upper tracks 135a formed by the roof assembly 130 in the extended configuration thereof, and lower tracks 135b formed by the mattress frame 88 in the extended configuration thereof. The tracks 135a and 135b fold and extend with the roof assembly 130 and mattress frame 88 respectively. The side walls 123 are biased by springs into a retracted storage position as indicated by arrow 136 within the cavity 60. Spacing the hinges 135a and 135b away from the rear wall 58 provides a space within the cavity 60 for the side wall 123 material to avoid crushing same when the mattress frame 88 and roof assembly 130 are folded into their folded configuration within the cavity 60.

In the expanded configuration of the camper assembly 20b, the side walls 123 are extended by pulling edges thereof toward the first section 22 as indicated by arrow 137. The edges of the side wall 123 are attached to the first section 22 by suitable means such as hooks, clips or magnets. The springs maintain the side walls 123 taut in their extended configuration. Prior to moving the camper assembly 20b into its compacted configuration, the edges of the side walls 123 are detached from the first section 22 and the side walls 123 are retracted by the springs to be within the cavity 60.

Alternatively, the side walls 123 of flexible material can be rolled in respective spring loaded rods adjacent each side wall 54 of the second section 24. The rods would extend from the top wall 52 to the bottom wall 56 of the second section 24 within the cavity 60.

The invention claimed is:

1. A camper assembly to be attached to and supported by a tow hitch receiver of a vehicle, the camping assembly comprising:
   a first section;
   a second section connected to the first section to provide for relative generally horizontal movement therebetween, between a compacted configuration of the camper assembly, at which the second section is adjacent the first section so that both sections can be supported by the hitch, and an expanded configuration of the camper assembly, at which the second section is spaced from the first section, with the sections when in the compacted configuration having an orientation relative to each other that is maintained during movement to the expanded configuration;

a wall assembly extending between the first and second sections in the expanded configuration of the camper assembly; and an attachment assembly secured to the first section and configured to solely support the camper assembly on the tow hitch receiver when the camper assembly is in the compacted configuration a foldable mattress frame connecting the first and second sections, the mattress frame being movable between a folded configuration wherein the mattress frame is stored within the first section and/or the second section in the compacted configuration of the camper assembly, and an extended configuration wherein the mattress frame extends substantially horizontally between the first and second sections in the expanded configuration of the camper assembly upon the relative movement, and a foldable roof assembly connected to the first and second sections, the roof assembly being movable between a folded configuration wherein the roof assembly is stored within the first section and/or second section in the compacted configuration of the camper assembly, and an extended configuration wherein the roof assembly extends between top walls of the first and second sections in the expanded configuration of the camper assembly upon the relative movement.

2. The camper assembly of claim 1 wherein the wall assembly comprises a flexible material extending across open spaces between peripheral walls of the first and second sections.

3. The camper assembly of claim 1 wherein the wall assembly is stored within the first section and/or the second section in the compacted configuration of the camper assembly.

4. The camper assembly of claim 1 wherein the mattress frame includes a first half and a second half which are substantially co-extensive with each other and pivotally connected to each other at their first ends, a second end of the first half being pivotally connected to the first section and a second end of the second half being pivotally connected to the second section.

5. The camper assembly of claim 1 wherein each of the first and second halves includes first and second spaced side beams with slats extending therebetween.

6. The camper assembly of claim 5 wherein each side beam is C-shaped in cross-section to define a channel, with the channels in each pair of side beams facing each other, and wherein the slats extend between lower webs of the side beams.

7. The camper assembly of claim 1 further including a mattress received in the mattress frame, wherein the mattress is folded with the mattress frame in the folded configuration of the mattress frame, and the mattress is supported by the mattress frame in the extended configuration of the mattress frame.

8. The camper assembly of claim 1 wherein the camper assembly further includes at least one foldable link connecting the first section to the second section, each link being movable between a folded configuration wherein the link is stored within the first section and/or second section in the compacted configuration of the camper assembly, and an extended configuration wherein the link extends between top walls of the first and second sections in the expanded configuration of the camper assembly.

9. The camper assembly of claim 8 wherein each link includes a first rod and a second rod which are substantially co-extensive with each other and pivotally connected to each other at their first ends, a second end of the first rod being pivotally connected to the first section and a second end of the second rod being pivotally connected to the second section, wherein each link includes a means for locking the first and second rods in the extended configuration.

10. The camper assembly of claim 1 wherein the roof assembly comprises a plurality of contiguous panels hingedly connected to each other in series, and wherein the roof assembly include a locking means for locking the panels in the extended configuration.

11. The camper assembly of claim 1 wherein the first section is generally rectangular prism shaped and includes side walls, a top wall, a bottom wall, a rear wall and a front wall, wherein the first section is substantially hollow and includes storage compartments therein.

12. The camper assembly of claim 11 wherein the second section is shaped substantially similar to the first section and includes a top wall, side walls, a bottom wall and a rear wall, which together define an internal space therewithin.

13. The camper assembly of claim 12 wherein in the compacted configuration of the camper assembly, front edges of the top wall, side walls and bottom wall of the second section abut corresponding rear edges of the top wall, side walls and bottom wall of the first section.

14. The camper assembly of claim 12 further including locking means for retaining the first and second sections to each other in the compacted configuration.

15. The camper assembly of claim 1 further including a roller support assembly extending from the second section, the roller assembly being movable towards the second section to be raised from the ground, or away from the second section to engage the ground for supporting the second section.

16. The camper assembly of claim 1 wherein the attachment assembly includes a square insertion tube for insertion to the tow hitch receiver, and a mount portion to which the camper assembly is mounted.

17. The camper assembly of claim 16 wherein lock apertures are formed in the sides of the insertion tube for receiving a lock pin therethrough when aligned with corresponding apertures of the tow hitch receiver.

18. The camper assembly claim 1 further including upper and lower tracks formed in the extended configuration of the camper assembly, the tracks being for guiding side walls of the wall assembly which are movable between a retracted configuration and an extended configuration at which the side walls extend between the first and second sections.

* * * * *